UNITED STATES PATENT OFFICE.

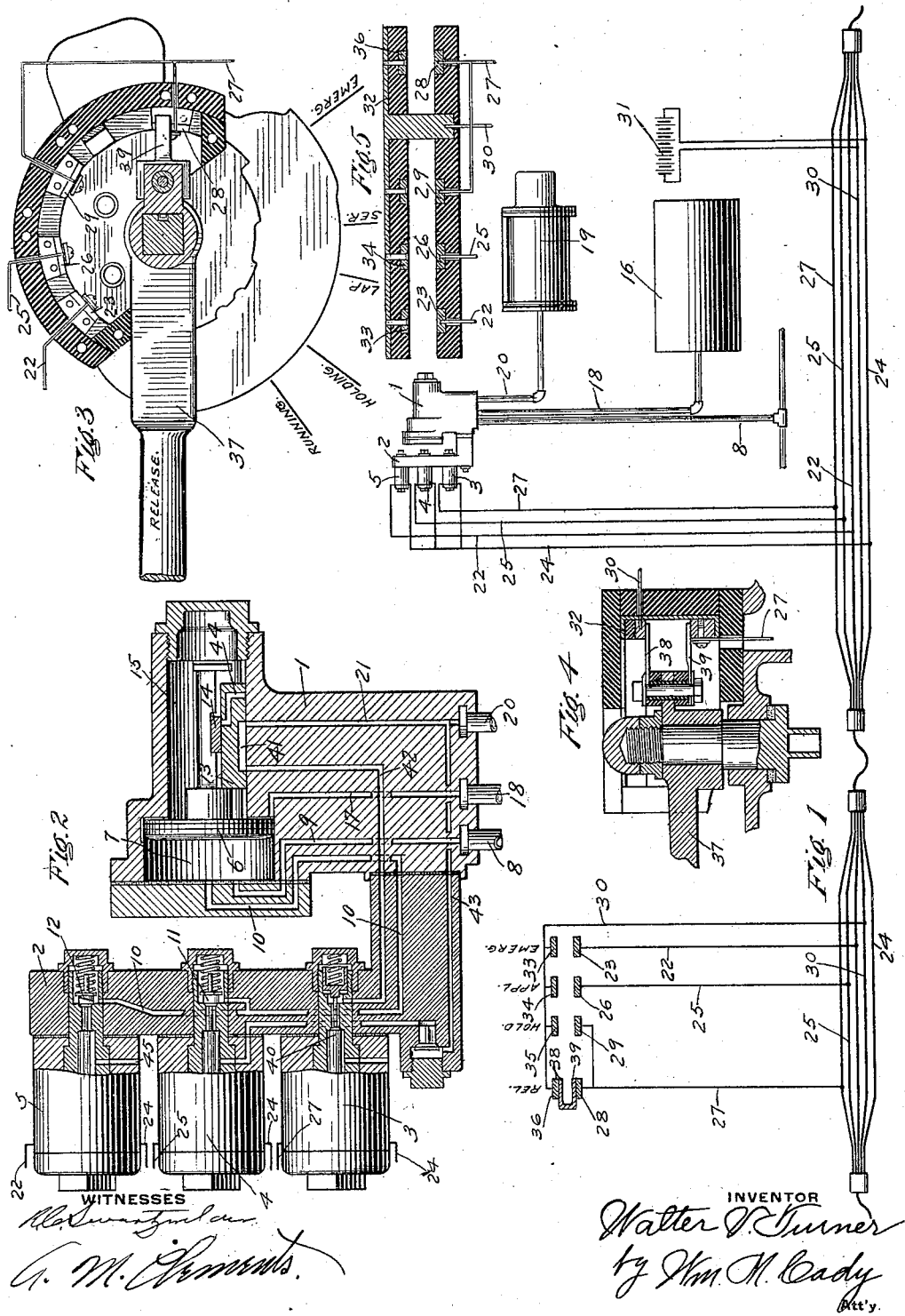

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE DEVICE.

1,192,961.  Specification of Letters Patent.  Patented Aug. 1, 1916.

Application filed August 15, 1913. Serial No. 784,875.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brake Devices, of which the following is a specification.

This invention relates to fluid pressure brakes, and more particularly to an electro-pneumatic brake apparatus.

My invention may be considered as an improvement in connection with the type of construction covered by my prior Patent No. 1,063,623, dated June 3, 1913, in which the equalizing valve portion of the brake controlling valve device is adapted to be operated by variations in train pipe pressure produced through the operation of the brake valve or by electrically varying the fluid pressure on the equalizing valve device.

Where the release of the brakes is controlled by the equalizing valve device, especially on long trains, owing to the time required to transmit an increase in train pipe pressure through the train, the equalizing valve devices at the head end of the train will move to release position before the equalizing valve devices at the rear end of the train, so that the brakes start to release first at the head end while the brakes at the rear end of the train are still applied, and this action tends to cause shocks by stretching the slack of the train and occasionally a break-in-two, if the train is a long one.

The principal object of my present invention is to provide means in releasing the brakes for holding the brakes applied until the equalizing valve devices throughout the train have moved to release position.

In order to accomplish the above object, I provide an electro-pneumatic brake valve device having a position in which the brake cylinder exhaust is electrically closed while fluid is supplied to the train pipe for moving the equalizing valve devices to release position.

In the accompanying drawing; Figure 1 is a diagrammatic view of the electric wiring for a two car electro-pneumatic brake equipment and embodying my invention; Fig. 2 a central sectional view of the car electro-pneumatic brake controlling valve device, shown diagrammatically in Fig. 1; Fig. 3 a plan view, partly in section, of the electro-pneumatic brake valve device employed; Fig. 4 a fragmentary vertical section of the brake valve device, showing the way in which the electric connections are effected; and Fig. 5 a development of the stationary contacts of the brake valve device.

In order to illustrate one application of my invention, I have shown a brake controlling valve device comprising an equalizing valve portion 1 and an electric application and release portion 2 applied to the equalizing valve portion. The electric control portion includes a release magnet 3, service application magnet 4 and emergency application magnet 5.

The equalizing valve device may comprise a piston 6 contained in piston chamber 7 connected directly to the train pipe 8 by passage 9 and also communicating with a passage 10 leading to electric service valve 11 and electric emergency valve 12 controlled by the respective magnets 4 and 5. The piston 6 controls a main slide valve 13 and a graduating slide valve 14 contained in valve chamber 15 which communicates with the auxiliary reservoir 16 through passage 17 and pipe 18. Brake cylinder 19 is connected to pipe 20 which communicates with passage 21 leading to the seat of the main slide valve 13.

One terminal of the emergency magnet 5 is connected by wire 22 with a contact 23 in the brake valve, while the other terminal of the magnet is connected to a negative current supply wire 24. One terminal of the service magnet 4 is connected to service wire 25 which leads to the contact 26 in the brake valve and the other terminal is connected to supply wire 24. One terminal of release magnet 3 is connected to release wire 27 which leads to contact 28 in the brake valve and the other terminal is connected to the common supply wire 24. A holding position is provided in the brake valve device and for this purpose, a contact 29 is employed which is connected to release wire 27. A positive current supply wire 30 is connected to a suitable source of current 31, the wire 30 being connected to a conductor's strip 32 in the brake valve having contacts 33, 34, 35, and 36 adapted to be connected upon movement of the brake valve handle with the respective contacts 23, 26, 29, and 28.

For connecting the stationary contacts of the brake valve device, the brake valve handle 37 carries electrically connected contacts 38 and 39 adapted to bridge the opposing stationary contacts of the brake valve.

The brake valve device is provided with the usual pneumatic control portion for controlling the brakes pneumatically and has positions for release, running, holding, lap, service, and emergency and the electric control contacts are arranged to provide electric operation corresponding with the pneumatic control positions.

In release position, the brake valve operates to supply fluid to the train pipe directly from the main reservoir, in the usual manner, and the release contact 28 is connected by the movable contacts 38 and 39 with the supply contact 36, so that the release magnet 3 is energized to close the electric release valve 40. The brake cylinder passage 21 is connected in the release position of the equalizing valve device by cavity 41 in slide valve 13 with release passage 42 controlled by the electric release valve 40, so that the exhaust of fluid from the brake cylinder is prevented by the closed electric release valve.

If a service application of the brakes is desired, the brake valve handle is turned to service application position, in which fluid is vented from the train pipe at the brake valve in the usual manner and at the same time, the service contacts 26 and 34 are bridged, so that the service magnet 4 is energized to vent fluid from the equalizing piston chamber 7 through passage 10 to the brake cylinder by way of passage 43. The equalizing piston is thereupon shifted to application position by the reduction in fluid pressure on piston 6 and the service port 44 is connected to brake cylinder passage 21 for supplying fluid to the brake cylinder.

In emergency application position the brake valve operates in the usual manner to effect a sudden reduction in train pipe pressure and the emergency contacts 23 and 33 are bridged, so as to close the emergency circuit and thereby energize the emergency magnet 5, to vent fluid from the piston chamber 7 to the atmospheric port 45. In the holding position the contacts 29 and 35 are bridged so that the release circuit is energized to hold the electric release valve closed while fluid is supplied to the train pipe by ports in the brake valve through the usual feed valve. In running position, fluid is supplied to the train pipe but the release circuit is open, so that fluid is released from the brake cylinder.

It will now be seen that in releasing the brakes, the brake valve handle may be first turned to full release position to supply main reservoir pressure to the train pipe and thereby shift the equalizing pistons throughout the train to release position while the release magnets are held closed so that fluid is not released from the brake cylinders, and then when the equalizing valves have been shifted to release position, the brake valve handle may be turned to running position, if it is desired to release the brakes, in which the release circuit is opened, so that fluid is released simultaneously on each car of the train, thus avoiding shocks due to the release starting at different times on different cars.

The brakes may be graduated off, if desired, by first moving the brake valve handle to full release position to start the equalizing pistons toward release position, then to running position to release fluid from the brake cylinders, and then, when the desired amount of fluid has been released from the brake cylinders, to holding position, in which the release magnets are energized to close the exhaust from the brake cylinders.

It will also be noted that as fluid is supplied to the train pipe in holding position and the equalizing valves being in release position, the supply reservoirs throughout the train are recharged, and this provides means for recharging the reservoirs without releasing the brakes.

As the exhaust from the brake cylinder is closed in full release position and in holding position, it will be seen that the auxiliary or other reservoirs may be recharged from the train pipe in the release position of the equalizing valve device without releasing the brakes.

Having now described my invention, what I claim as new and desire to secure by Letters Patent, is:—

1. A brake valve device for fluid pressure brakes provided with contacts for electrically controlling the brake cylinder exhaust and having a running position in which the brake pipe is charged through the usual feed valve and the brake cylinder exhaust is open, said brake valve being movable directly from the running position to a position on either side in which the brake cylinder exhaust is electrically closed, fluid being supplied to the brake pipe directly from the main reservoir in one position and through the feed valve in the other position.

2. In a fluid-pressure brake, the combination with a train pipe, of a valve device operated by an increase in train pipe pressure for releasing the brakes, electrically controlled means for also controlling the release of the brakes, and a brake valve device having a full release position for supplying fluid to the train pipe directly from the main reservoir and in which the operation of said electrically controlled means is effected to prevent the release of the brakes, a running position for supplying fluid to the train pipe from the feed valve device and in which the operation of said electrically controlled means is effected to permit the release of the brakes, and a third position in which fluid is supplied to the train pipe and the operation of said electrically controlled means is effected to prevent the release of the brakes, said positions being arranged in immediate sequence.

In testimony whereof I have hereunto set my hand.

WALTER V. TURNER.

Witnesses:
A. M. CLEMENTS,
S. W. KEEFER.

Copies of this patent may be obtained for five cents each, by addressing the "Commissioner of Patents, Washington, D. C."